Dec. 2, 1969 R. A. CELLITTI ET AL 3,481,186
METHODS OF AND SYSTEMS FOR EFFECTING THE NONDESTRUCTIVE
ANALYSIS OF MATERIALS
Filed Oct. 1967 6 Sheets-Sheet 3

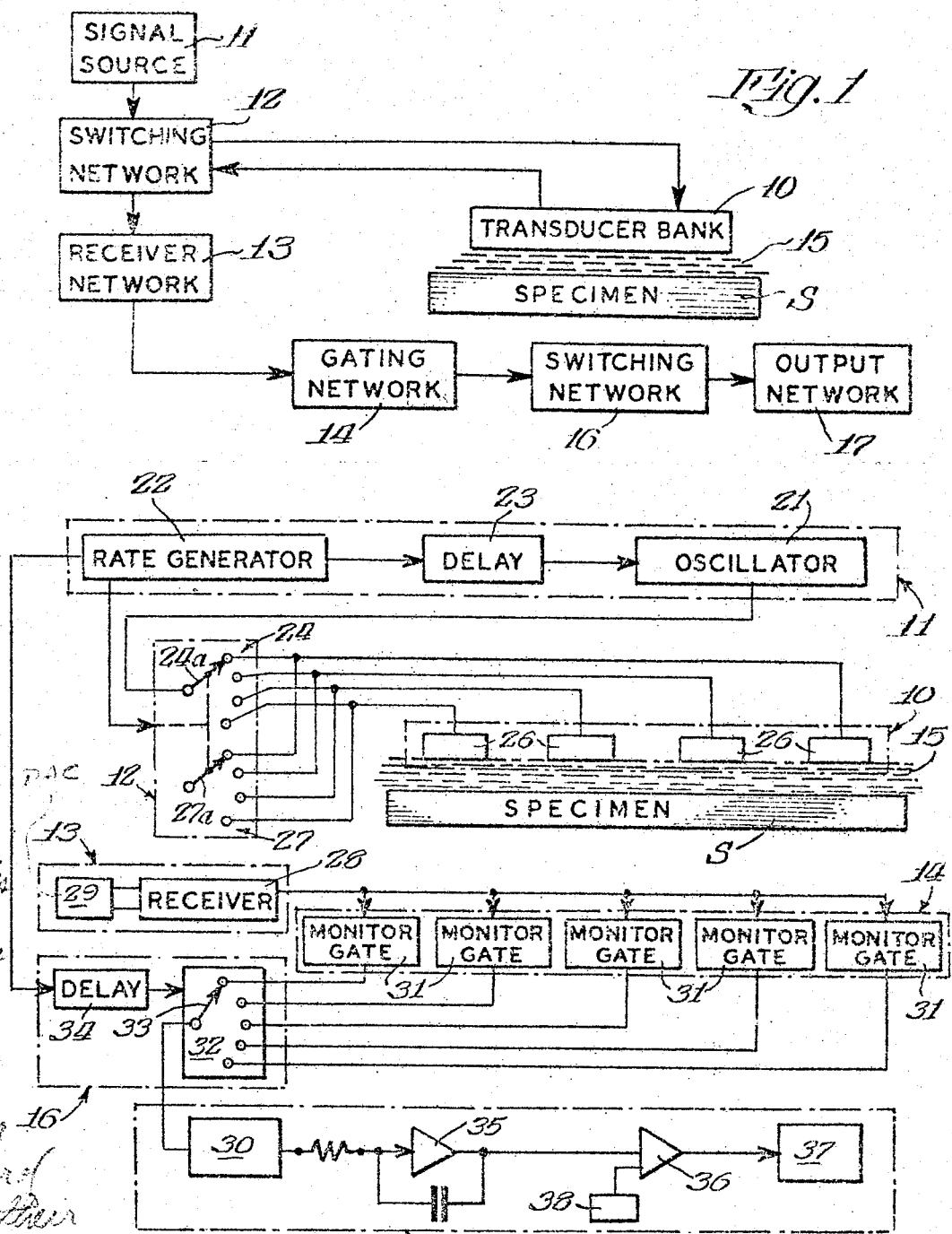

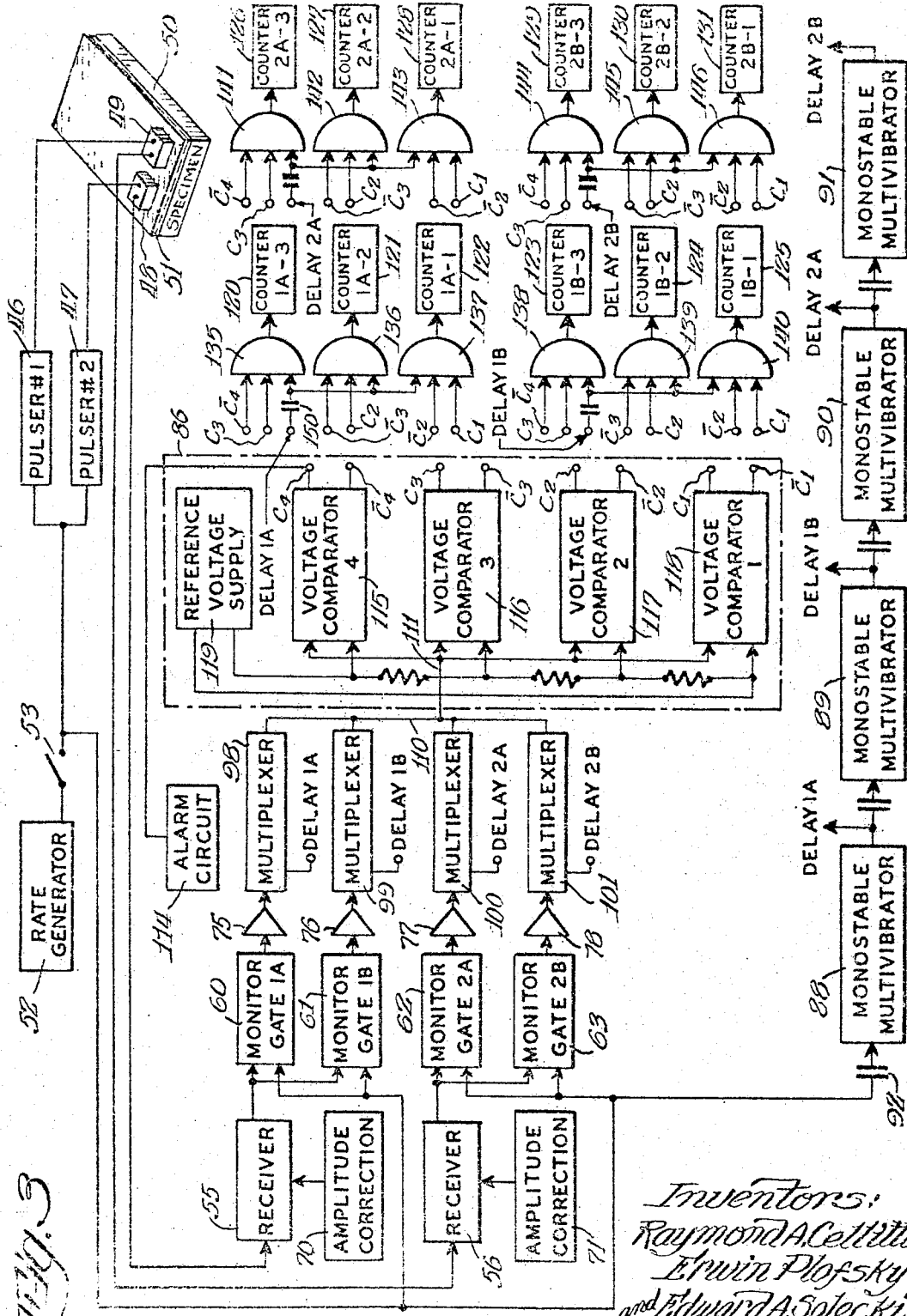

Inventors:
Raymond A. Cellitti,
Erwin Plofsky,
and Edward A. Solecki
By Hume, Clement, Hume & Lee Attys

| HEAT | OPERATOR |
| BILLET | DATE |
| COUPON | |
| PASS | |
| GATE | |
| GAIN SETTING | P. FACT SET # 1.0 |

| CATEG | COUNT | FREQ | P. FACT. | PROD |
|---|---|---|---|---|
| 1 | 61 | .0045 | .5 | .0022 |
| 2 | 1500 | .1106 | 1.0 | .1106 |
| 3 | 4056 | .2990 | 2.0 | .5980 |
| 4 | 4084 | .3010 | 4.0 | 1.2042 |
| 5 | 2323 | .1712 | 8.0 | 1.3699 |
| 6 | 1060 | .0781 | 16.0 | 1.2502 |
| 7 | 366 | .0270 | 32.0 | .8633 |
| 8 | 105 | .0077 | 64.0 | .4954 |
| 9 | 11 | .0008 | 128.0 | .1038 |
| 10 | 0 | .0000 | 256.0 | .0000 |
| 11 | 0 | .0000 | 512.0 | .0000 |
| 12 | 0 | .0000 | 1024.0 | .0000 |
| 13 | 0 | .0000 | 2048.0 | .0000 |
| 14 | 0 | .0000 | 4096.0 | .0000 |
| 15 | 0 | .0000 | 8192.0 | .0000 |
| 16 | 0 | .0000 | 16384.0 | .0000 |

STORED INDEX  1.5
CALCD INDEX   6.0

United States Patent Office 3,481,186
Patented Dec. 2, 1969

3,481,186
METHODS OF AND SYSTEMS FOR EFFECTING THE NONDESTRUCTIVE ANALYSIS OF MATERIALS
Raymond A. Cellitti, Hinsdale, Erwin Plofsky, Chicago, and Edward A. Solecki, Canton, Ill., assignors to International Harvester Company, Chicago, Ill., a corporation of Illinois
Continuation-in-part of application Ser. No. 440,572, Mar. 17, 1965. This application Oct. 5, 1967, Ser. No. 673,109
Int. Cl. G01n 9/24
U.S. Cl. 73—67.9                  23 Claims

ABSTRACT OF THE DISCLOSURE

A non-destructive method and system are disclosed for providing an accurate assessment of the overall or cumulative effect of randomly distributed non-metallic inclusions and other discontinuities on the physical properties, such as ultimate tensile strength, of a metal specimen. Ultrasonic wave energy is transmitted into a large number of discrete incremental volume elements of the metal specimen and certain ultrasonic signal energy reflected from each volume element (which reflected energy is representative of at least the size of detected discontinuities) is individually considered by a computer system in developing an ultimate output which meaningfully categorizes the specimen according to a quality standard. The computer may, for example, relatively weight the discontinuities according to the pre-established effect of discontinuities of each detected size on the physical properties of the specimen and then sum these weighted signals to arrive at a net quality index. Several embodiments and numerous features are disclosed.

Cross-reference to related application

The present application is a continuation-in-part of application, Ser. No. 440,572, filed Mar. 17, 1965, now abandoned, entitled "Methods of and Systems for Effecting the Nondestructive Analysis of Materials."

Introduction

This invention relates to methods of and systems for effecting the nondestructive analysis of materials. More particularly, the invention is directed to the statistical evaluation of non-metallic inclusions and/or other forms of similar discontinuities in homogeneous production materials such as steel, aluminum and the like.

Summary of the invention

It is an object of the invention to provide nondestructive methods of and systems for effecting a fully automated statistical analysis of production materials.

Still another object of the present invention is to provide a method of and an automated system for making a determination as to the size distribution of discontinuities (e.g. non-metallic inclusions) within specimens of production materials (e.g. steel, aluminum and the like) and for yielding an output that reflects the analysis and is utilized to classify the specimens according to pre-established standards.

A further object of the present invention is to provide a method of and system for effecting a detailed statistical analysis of homogeneous production materials with respect to discontinuities by ultrasonically inspecting up to approximately 85% of the volume of the material and electronically determining the distribution of the discontinuity sizes.

A more specific object of the invention is to provide system for analyzing homogeneous production materials on a production basis through the use of ultrasonic detection equipment in conjunction with electronic signal generating means and signal responsive automated material classifying means.

Brief description of the drawings

Other objects and advantages of the present invention will become apparent from the following detailed description thereof particularly when considered in conjunction with the accompanying drawing wherein:

FIGURE 1 is a block diagram of a system for carrying out the non-destructive, statical evaluation of non-metallic inclusions and/or other similar discontinuities in homogeneous production materials such as steel, aluminum and the like;

FIGURE 2 is a more detailed representation of a preferred embodiment of the system depicted in FIGURE 1;

FIGURE 3 is a diagram of a further embodiment of the present invention utilizing plural transducer elements and a digital output circuit in place of the analog output network of FIGURE 2;

FIGURE 8 is an electrical signal chart useful in understanding the operation of the circuit of FIGURE 6;

Description of the preferred embodiments

Figure 4:
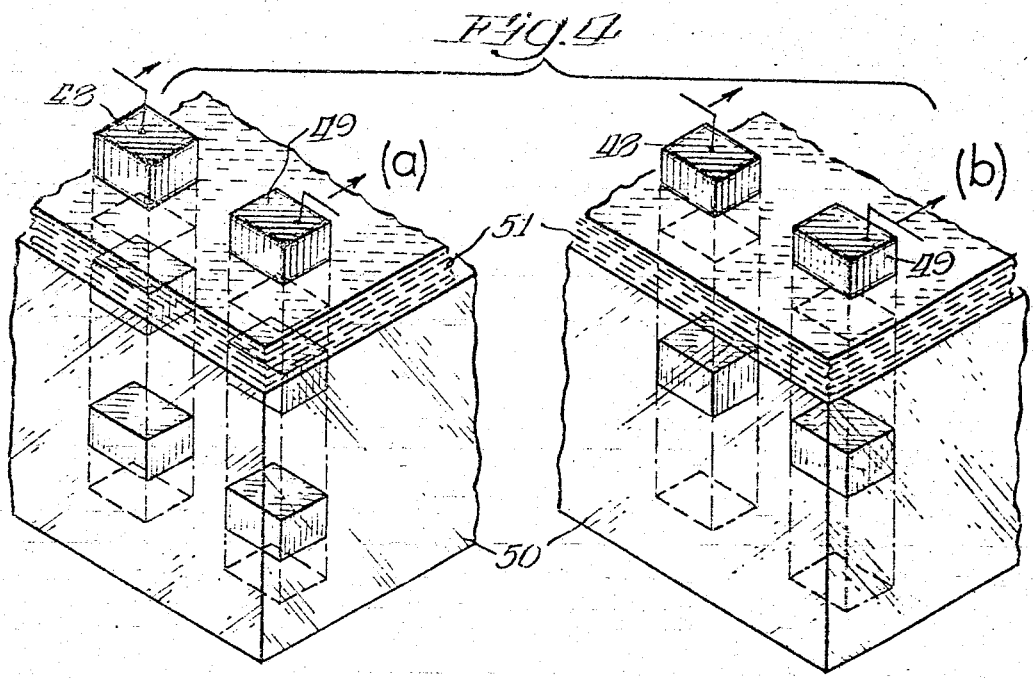
FIGURES 4a and 4b illustrate in semi-diagrammatic form two possible transducer scanning patterns useful in inspecting the internal volume of a metal specimen.

The present invention is directed to methods of and system for effecting the nondestructive testing of homogeneous production materials (e.g. steel, aluminum and the like) so as to yield a statistically reliable indication of the presence and size of discontinuities (e.g. non-metallic inclusions) within the material. The invention contemplates employing the results of the test or analysis for the purpose of classifying and/or segregating the material on a production basis and prior to the time that structural components are fabricated from the material. In accordance with the invention, up to approximately 85% of the volume of material is rapidly and accurately analyzed through the use of ultrasonic detection technique. Preferably, a comparative analysis is carried out whereby the analyzed results are weighed against accurate findings relating to similarly processed material but stemming from detailed destructive (e.g. microscopic) testing of the material.

Referring more specifically to FIGURE 1, the nondestructive testing is preferably carried out by means of ultrasonic inspection techniques whereby a reliable statistical determination is made of non-metallic inclusion sizes in production materials such as steel, aluminum and the like, which statistical determination is utilized as a basis for classifying the material according to preestablished standards. In this connection, a material specimen S is advanced relative to a conventional form of transducer bank or search unit 10 which is intermittently supplied with a high frequency signal from a signal source 11 through a first switching network 12. In a conventional manner, the output from the transducer search unit 10 is coupled to the specimen S through a suitable fluid couplant 15 so that the ultrasonic pulses yielded by the search unit are imparted to the specimen as mechanical vibrations.

In response to the intermittently transmitted output from the transducer search unit 10, a plurality of reflected sound pulses or "echoes" from the specimen are sensed by the search unit. The reflected pulses or echoes correspond principally to the couplant-specimen interface, discontinuities (e.g. non-metallic inclusions) that exist in the specimen and the bottom surface of the specimen. The output from the search unit 10 is preferably coupled through the first switching network 12 to a receiver network 13 that includes suitable signal amplitude compensating circuitry. The output from the receiver network 13 is fed through a gating network 14 and through a second switching network 16 to an output circuit 17.

Upon receipt of the reflected signals, the receiver network produces amplitude compensated signals corresponding to the reflected pulses generated from the specimen. Each amplitude compensated signal corresponding to a reflected pulse has a magnitude that is proportional to the size of the discontinuity causing the generation of the reflected pulse. In response to the output from the receiver network 13, the gating network 14 stores and is conditioned to yield discrete analog signals corresponding to the detected discontinuities or non-metallic inclusions at specific depths within the specimen. In this connection and in a conventional manner, the gating network is selectively preconditioned to produce such discrete signals since the network is selected to operate on a time differential basis which is adjustable to meet the requirements for a given testing operation.

The inclusion-size representative signals that are stored within the gating network are derived from this network in response to the actuation of the second switching network 16. When the switching network is actuated to supply the signals from the gating network to the output circuit 17, the statistical computing phase of a testing cycle is initiated. That is, the output circuit 17 preferably functions to effect a comparative analysis of the information actually derived from the specimen as it relates to preset reference conditions so that the specimen can be reliably classified on a production basis in terms of the discontinuity size distribution.

In FIGURE 2, the system is depicted in greater detail. As shown, the signal source 11 is illustrated as including a high frequency oscillator circuit 21 which is intermittently actuated to produce a high frequency signal by a rate generator 22 through a conventional time delay circuit 23. More specifically, the oscillator circuit 21 is selected to produce a high frequency signal (e.g. a 5 megacycle signal) so that the optimum detection of discontinuities within the specimen S is effected. In this connection, the oscillator circuit includes a normally non-conductive signal responsive component (e.g. a thyratron), which when triggered into conduction by the rate generator 22 and in a conventional manner, results in the production of a high frequency signal for a preselected period of time.

The rate generator 22, which supplies the triggering signals for the oscillator 21 preferably includes a conventional timing network that dictates the intermittent production of the necessary triggering signals to render the oscillator effective. The triggering of the oscillator preferably occurs at an extremely rapid repetition rate and the high frequency output signal from the oscillator has a relatively short time duration of approximately 2–3 microseconds. In this connection, various factors (e.g. the number of transducers, the number of gates, the rate at which the specimen is scanned, the response characteristics of the system components, etc.) dictate the rate at which the oscillator is triggered in any given production operation. Nevertheless, rates of between approximately 250–2500 triggering pulses per second are compatible with most production material analysis techniques as contemplated by the present invention.

The output from the oscillator 21 is selectively fed through one switching bank 24 of the first switching network 12 and to one of a plurality of transducers 26 that comprise the transducer search unit 10. In addition, the transducers 26 are connected through a second switching bank 27 of the network 12 to the input of the receiving and signal conversion portion of the network 13. Preferably, the output from the rate generator 22 controls the simultaneous operation of the switching banks 24 and 27 so that the actuation of these switches is synchronized with the intermittent transmission of a high frequency signal by the oscillator 21. That is, the rate generator 22 produces a pulse that advances both the wiper arms 24a and 27a so that the high frequency signal supplied from the oscillator is coupled to one of the transducers 26. To allow for the necessary switching time, the triggering pulse to the oscillator 21 from the rate generator 22 is delayed by the circuit 23 for a pre-selected period of time. At this time the wiper arm 27a, which is actuated simultaneously with the wiper arm 24a, is located so that the reflected pulses derived from the specimen by the same transducer after the end of the transmission period are supplied to the receiving and signal conversion circuit 28.

The transducers 26 are preferably conventional piezo-electric transducers that may be formed of lithium sulphate, quartz, barium titanate, lead zirconate and the like. These individual transducers are preferably mounted as an assembly within a conventional transducer search unit which, for example, is designed to be advanced relative to the surface of the specimen being analyzed. Any number of conventional multi-transducer search units can be employed with the system of the present invention, although so-called "straight beam" search units are perhaps best suited for use with the illustrated system.

In this latter regard, the specimen S can be analyzed by various forms of search units when immersed in a tank of water (i.e. the couplant 15 is the water above the surface of the specimen). Alternatively, other forms of search units are coupled to the specimen through a layer of water, oil or other suitable liquid medium that is maintained in the region between the individual transducers 26 and one surface of the specimen. Irrespective of the specific form of search unit, the system of the present invention contemplates the use of a sufficient number of transducers 26 that are pulsed at a sufficiently rapid repetition rate so that up to approximately 85% of the volume of the specimen is analyzed at the selected rate at which the search unit is advanced relative to the specimen or vice versa.

Referring again to FIGURE 2, the reflected pulse output from the transducers 26 is supplied to the receiver network 13 whereat the reflected pulses are converted to amplitude compensated signals having a magnitude directly related to the size of the detected discontinuities. In this connection, the receiving and signal conversion circuit 28 coacts with an amplitude compensating circuit 29 that is also included in the receiver network 13. The amplitude compensating circuit 29 is preferably a time responsive network that proportionally adjusts the magnitude of the signals corresponding to the reflected pulses in accordance with the depth at which the reflected pulse producing discontinuity is located within the specimen.

In this connection and because of the dissipation of signal energy within the material, a discontinuity close to the bottom surface of the specimen causes the generation of a reflected signal having a magnitude that is somewhat less than an identically sized discontinuity close to the top surface of the specimen. By sensing the start of the transmission period through the specimen and the time when the reflected pulses are received, the amplitude compensating circuit 29 proportionally adjusts the amplitude of the pulses so that those representing discontinuities of the same identical size are passed from the receiving network to the gate network as signals of equal magnitude. Essentially, the amplitude correction circuit 29 produces a signal having a wave shape corresponding to the reflected signal attenuation characteristics of the material as related to depth. This shaped signal, when supplied to the circuit 28, causes a compensating gain adjustment in the receiver network output in direct relation to the time difference between the generated and reflected signals.

Upon completion of the amplitude compensating function, the receiving circuit 28 produces output signals having a magnitude that is proportional to the size of the detected discontinuities. The amplitude compensated signals from the network 13 are supplied to the gating network 14 and more particularly to the individual gating circuits 31 which sense and store these signals as D.C. counterparts. That is, the gating circuits 31 store an analog of the receiver output signals produced at the various depths within the specimen to which each individual gating circuit is preset to respond.

In this connection, the gating circuits 31 are preferably conventional time responsive networks that are actuated to receive signals for a preset time period and which are non-responsive to signals at any other time. Through the use of a plurality of time responsive gates 31, the reflected signals from various depth portions of the specimen are segregated from corresponding signals from other depth portions thereby improving the sensitivity and the reliability of the analysis effected by the system. For example, if an analyzed specimen has a thickness of 5", a first gating circuit 31 is preset on a time basis to respond to signals corresponding to discontinuities located in the 3"-4" depth level of the specimen. The second and subsequent gating circuits are similarly preconditioned to respond to signals representing discontinuities at other incremental depth levels, with the number of gates, being a significant factor in the overall sensitivity of the system. The gating circuits 31 preferably include capacitive networks that store D.C. discontinuity-size representative signals until the second switching network 16 is actuated to facilitate the sequential read-out of these signals.

The individual outputs from the gating circuits 31 are connected to the second switching network 16 which includes a bank of switch contacts 32, a selectively actuated switching element 33 and a time delay-switch actuating circuit 34. As shown, the output from the rate generator 22 is also coupled to the time delay circuit 34 in the network 16. In response to a triggering pulse from the rate generator 22, the time delay circuit is rendered effective to control the actuation of the switch wiper arm 33 relative to the switch contacts 32, with each contact supplying the output from one of the gating circuits 31.

Preferably, the time delay-switch actuating circuit 34 is preset so that the switch arm 33 is not actuated to allow the sequential sampling and read-out of the individual gating circuits 31 until a preset minimum time interval has elapsed. This minimum time interval is selected so as to insure that all discontinuity-size representative pulses which might be reflected from the specimen S in response to the transmission of an ultrasonic signal from one of transducers are received, converted and stored within the gating circuits 31. However, after the lapse of this time interval, the circuit 34 advances the switch wiper arm 33 to sequentially sample and read-out the stored information from the gating circuits.

For typical material classification operations that are carried out on a production basis, the gating circuits are selected to operate on the principle of storing an analog of the signals derived from the receiver circuit 28 in a capacitive network as outlined above. Therefore, the output from the sequentially scanned gating circuits in such a system corresponds to the maximum signal and, accordingly, reflects the maximum discontinuity area present in the gated portions of the specimen. Obviously, the sensitivity and responsive characteristics of this portion of the system are readily adaptable to more sophisticated and/or non-production testing procedures wherein, for example, one might be interested in extremely detailed evaluations of material specimens.

In this connection, the gating circuits 31 are sampled each time the wiper arm 33 is sequentially advanced across the switch contacts 32. Assuming that the rate generator 22 is functioning so that triggering pulses are produced at a rate of 2000 pulses per second, each of the gating circuits is similarly sampled 2000 times per second. That is, the discontinuity-size representative signals that are stored in the gates during each transmission and reception period are sampled and read out at the end of each such period. As an alternative to this scanning technique, a separate oscillator circuit can be employed to selectively energize the time delay-switch actuating circuit 34. Such a separate oscillator can be utilized in a given production operation when the triggering rate of the generator 22 is below the rate at which one desires to sample the outputs of the gating circuits.

Whether utilizing the rate generator 22 or a separate oscillator as the means for controlling the sampling rate of the various gating circuits 31, it will be appreciated that in a given situation the responsive characteristics of the output circuit 17 might necessitate that an inhibiting signal be supplied to the signal source 11 until such time as a sampling operation has been completed. In a conventional manner, such an inhibiting pulse would be supplied from the time delay-switch actuating circuit 34 so that the oscillator 21 could not be rendered effective until the sampling process corresponding to the previous transmission period is completed.

The output from the switching network 16 (i.e. the sequentially sampled outputs from the gating circuits 31) is fed to the output circuit 17, which circuit is utilized to compute the results of the specimen analysis and conduct a comparative evaluation of the measured results relative to preestablished reference data (e.g. corresponding to a detailed microscopic analysis of similarly processed material). The output circuit 17 is preferably comprised of conventional computing and/or logic circuits capable of integrating the output from the gating circuits 31 over the test period so as to yield a reliable evaluation of the discontinuity size distribution within the specimen.

Such an output function can take the form of a selectively adjustable pulse counting operation, calculating a standard deviation from a reference mean, determining a standard deviation from a reference median or computing other factors that accurately reflect the discontinuity-size distribution characteristics of a specimen on a statistical basis. Accordingly, a versatile form of one of several commercially available computers is preferably employed in the output network (e.g. the TR-20 or TR-48 analog computer marketed by Electronic Associates, Inc. under the trademark PACE).

FIGURE 2 illustrates a simplified yet representative computing circuit capable of effecting an output function compatible with the aforedescribed commercially available computers and consistent with the type of statistical analysis contemplated by the present invention. More specifically, the output from the second switching network 16 is preferably supplied through an exponential amplifier 30, an integrating circuit 35 and through a difference amplifier 36 to a responsive classifying device 37 associated with the production equipment. In a conventional manner, the exponential amplifier 30 takes the discontinuity-size representative signals that are sequentially derived from the gating circuits 31 and amplifies these signals so that the output from the circuit 30 yields a properly weighted amplification of the large and smaller discontinuities detected during the operation of the system. This appropriately amplified output is fed through the integrating circuit 35 which yields an integrated signal corresponding to the weighted average of the discontinuity-size representative signals produced during an entire analyzing operation.

The output signal from the integrating circuit is in turn supplied to the difference amplifier 36 where the weighted signal is compared against a reference signal supplied from a reference signal source 38. Preferably, the reference signal from the source 38 is preset in accordance with the results of a detailed evaluation of similarly processed material so that the difference amplifier 36 produces an output which is indicative of the correlation between the output from the integrating circuit 35 and the reference signal. The output from the amplifier 36 is in turn fed to a suitably responsive production control device which, for example, effects an automated classification of the specimen that has just been sampled either immediately or on a time delay basis. Assuming that the specimen S is a steel billet which the system has evaluated and found to have characteristics corresponding to production steel of a selected grade, the device 37 can be used to mark the specimen with visible indicia characterizing the billet as being of that particular grade.

In accordance with the present invention, a statistical evaluation of homogeneous production material is initiated by placing a specimen S of the material adjacent the multi-element transducer search unit 10. Thereafter and as a result of relative movement between the search unit and specimen, up to approximately 85% of the volume of material is inspected so that an electronic determination of discontinuity size distribution is achieved. More specifically, the individual transducers 26 are sequentially triggered with a short duration high frequency signal. As a result and in a preselected sequence dictated by the first switching network 12, reflected pulses, which are derived from the specimen of material in direct response to the transmission of ultrasonic wave energy thereto, are supplied from the then actuated transducer to the receiving network 13. This sequential pulsing of the transducers 26 is continued until the entire specimen has been scanned.

Throughout the period when the material is scanned by the search unit 10, the receiving network 13 responds to the reflected pulses that are sequentially derived from the then actuated transducer and produces amplitude compensated discontinuity-size representative signals. These signals are fed to the selectively responsive gating circuits 31. In this connection, all of the gating circuits 31 are conditioned to be responsibe to the reflected pulse signals that are picked up by each transducer 26 so that various depths of the specimen are monitored by each transducer during the brief period that it is transiently rendered effective. At the conclusion of the transmitting and receiving operational periods for each transducer 26, the second switching network 16 is rendered effective to sample and derive the output from each of the gating circuits 31 in sequential fashion and at a preselected sampling rate. The output from each gating circuit is sequentially fed through the switching network 16 and is supplied to the output circuit 17.

As previously set forth in detail, the output circuit 17 functions to produce a signal distribution which gives properly weighted effect to the large and small discontinuity-size representative signals. More specifically, this circuit converts the signals derived from the gating circuits 31 into a signal that is reliably indicative of the discontinuity size distribution throughout the specimen being analyzed. This information is compared against preestablished reference data supplied to the output circuit. The correlation between the actual test results and the reference data dictates how a responsive output device 37 is to function to effect the classification of the specimen in accordance with preset production standards.

Referring now to FIGURE 3, the system embodiment there shown differs from the previously described construction by providing a series of numerical counters to yield a numerical or digital read-out of the number of detected discontinuities in each of the several measured size range categories as well as an indication of the position of these discontinuities within the body of the specimen. The position indication is used in the present embodiment to reveal any abnormally large concentrations of discontinuities in the specimen which may affect the validity of a quality assessment based on a statistical distribution of the discontinuities according to the sole parameter of size. It is understood, however, that the relative positions of the discontinuities may be considered in the statistical calculations, if such a refinement is desired or deemed necessary. At any rate, the assembled sampling information provided by the numerical reading on each counter is interrelated so as to provide an accurate indication of the net or total effect of specimen discontinuities on a selected bulk physical property, such as maximum tensile strength, of the inspected specimen.

The present system again comprises means for transmitting ultrasonic wave energy into a plurality of discrete volumetric elements of the specimen. Specifically, this means includes a pair of pulsing units 46 and 47 coupled to respective ones of a pair of conventional ultrasonic transducers 48 and 49 of the focused beam immersion type, although transducers of any other known type are satisfactory. The transducers are adapted to communicate high frequency ultrasonic vibrations into the body of a metal specimen 50 through a suitable fluid coupling medium, indicated schematically by the numeral 51, in response to appropriate excitation by the pulsing units 46 and 47. The pulsing units, as their name indicates, are only intermittantly effective to translate excitation signals to their associated transducers, the time period beween operative intervals of the pulsing units being established by a rate generator 52 coupled to both pulsing units through a manual start switch 53 positioned on the instrument control panel for the apparatus.

The rate generator 52 is typically a free running multivibrator and the identical pulsing units each conventionally comprise a hydrogen thyratron which, when periodically triggered into conduction by the rate generator 52, provides a momentary capacitor discharge path through a tuned circuit effectively connected in parallel with a corresponding transducer. Each transducer transmits mechanical vibrations towards the specimen at a frequency corresponding to the resonant frequency of the tuned circuit and for a brief time interval corresponding to the ringing interval of the tuned circuit.

As is well known in the art, the transducers 48 and 49 transmit ultrasonic energy into the specimen as a narrow well defined beam and the reflected wave energy returns to the transducer along this same path. Hence, to ultrasonically inspect a large portion of the metal specimen, it is necessary to provide some means for effecting relative movement between the transducer and specimen so that different portions of the specimen may be successively aligned with the beam paths of the transducers. This well known scanning apparatus has not been illustrated both for the sake of simplicity and since its construction forms no part of the present invention. A suitable form of scanning apparatus is, however disclosed in Patent No. 2,989,864. In this connection, it will also be recognized that the number of sample volumes which may be separately inspected during the course of movement of the transducers from one end to the other of the sample specimen is a function of the repetition frequency of the rate generator 52 and the relative rate of movement of the specimen and transducers during scanning. In one embodiment of the invention, a transducer scanning rate of 5 inches per second was used in connection with a rate generator frequency of 1000 cycles per second. Scanning rates in the range of 1–20 inches per second with rate generator frequencies of 750–2000 cycles per second are generally acceptable for use in connection with the system of the invention.

The present system also includes means for receiving the ultrasonic wave energy from within at least a preselected portion of each of the individually inspected volume elements of the specimen which reflected energy is representative of predetermined discontinuity characteristics, particularly size, within the selected portion of the volumetric unit. In the present embodiment, the transducers 48 and 49 serve a dual function of transmitting and receiving and, for this reason, the transducers are also coupled to individual receivers 55 and 56, respectively. Conventionally each receiver comprises a radio frequency amplifier, a diode detector and a radio frequency filter.

The electrical signal output of each receiver is an amplified amplitude envelope constituting an electrical analog of the reflected ultrasonic wave signal energy received by the transducer during each receiving interval. Since the rate of relative movement between the transducers and the specimen is relatively slow in comparison to the transmit-receive time interval, each transducer is effective to transmit ultrasonic energy into an incremental volume element of the specimen and to receive the reflected energy therefrom before it has moved an appreciable distance. Any reductions in received signal amplitude attributable to such movement may, however, be effectively compensated for by the amplitude correction circuits to be considered later herein.

It is often desired that each of the aforesaid individual volume elements be divided into a plurality of smaller sampling zones. This substantially increases the number of samples acquired in a given scanning interval as well as permitting selective consideration of various depth regions in the specimen. To effect a segregation of the information in each volumetric element by depth zone, the electrical signals developed at the output terminals of receivers 55 and 56 are coupled to a plurality of monitor gates 60–61 and 62–63, respectively. In the present embodiment, only two monitor gates are provided for each receiver, although it will be understood that a greater number may be provided if desired. Each monitor gate is also provided with a synchronizing or timing signal input from the rate generator 52. As will be explained more fully later herein, the monitor gates include timing circuits for accepting receiver input signals only during limited time periods commencing at respective preset times from the beginning of each reference signal cycle of rate generator 52. This time domain segregation of signals is in fact a separation by depth, since, as is well understood in the art, the time required for the ultrasonic "echoes" to penetrate the specimen, rebound from a discontinuity and return to the transducer identifies the depth of the discontinuity within the specimen.

The monitor gates also constitute the sampling means for the system and for this purpose each monitor gate further includes a peak sample and hold circuit for detecting and temporarily recording the highest signal value applied thereto during the term of its respective gating interval. Thus, at the end of a receiving interval each of the monitor gates 60–63 has stored therein an electrical signal which is proportional in amplitudes to the largest size discontinuity within its respective sample zone. In other words, although a number of discontinuities may be discovered in a zone, all but the largest is ignored.

As discussed previously herein and as is well understood in the art, the metal specimen progressively attenuates ultrasonic signals propagating therethrough in proportion to the distance traveled within the specimen. Other non-linearities in the system may also result in non-equal signal outputs for discontinuities of equivalent size but differing depth levels within the specimen. For instance, assuming the transducers 48 and 49 to be of the focused beam type, the transmitted ultrasonic beam conically tapers toward a narrow focal point and then diverges as it passes beyond this focal point. The amplitude of the reflected energy likewise increases and decreases as the focal point is approached and passed, respectively, independent of the size of the encountered discontinuity.

Accordingly, to assure that equal size discontinuities at different depth levels within the specimen 50 provide equal amplitude signals to the monitor gates, the receivers 55 and 56 are provided with respective amplitude correction circuits 70 and 71. The blocks 70 and 71 include automatic gain control circuits for developing a dynamic adjustment of the gain of each receiver complementary to the various non-linear characteristics of the system to the end that equal size discontinuities at any depth in the body of the metal specimen 53 provide equal level signals to the monitor gates. The gain adjustment required by the correction circuits 70 and 71 is most simply ascertained by an empirical method which involves the use of a metal specimen having discontinuities of known size and location. An example of one known amplitude correction circuit as well as the method for determining the amplitude gain control characteristics needed for a particular environment is provided in Weighart Patent No. 3,033,029, issued May 8, 1962.

Thus, each of the monitor gates 60–63 receives and stores during each transmit-receive interval a signal having an amplitude which is proportionately representative of the maximum size discontinuity within its volumetric zone. The outputs of the monitor gates 60–63 are coupled to respective scaling and offset amplifiers 75–78. These are D.C. amplifiers having an appropriate gain factor for expanding or compressing the scale range of the signals detected from the metal specimen to match the scale range of the digital sorting and counting apparatus which follows. The amplifiers 75–78 are further output biased or offset to effect a correspondence between the zero levels of the two scales.

It is convenient at this point to consider in greater detail what the received and amplified discontinuity information actually represents in terms of the physical composition of the metal specimen. It is, of course, well understood in the art that ultrasonic wave energy is reflected from the boundary between media of differing physical characteristics and this fundamental recognition has been used to discover solid particles in fluids and voids or cracks in metals, by use of comparatively low ultrasonic signal frequencies. The system of the present invention is not interested in discerning information of the foregoing types but rather is interested in discovering metallurgical discontinuities such as non-metallic inclusions or alpha segregations in titanium. Unlike voids or cracks, etc., non-metallic inclusions to at least a modest degree are expected in even high quality steel, aluminum and other metals. In other words, the mere presence of a non-metallic inclusion does not represent a flaw in the material; however, the population and size levels of such non-metallic inclusions do have a significant influence on the physical properties of a metallic specimen and must be known to predict with certainty whether a particular specimen is suitable for a given application. For example, the quality of high strength steel is seriously impaired by an extensive population of non-metallic inclusions while a population of an equal or even greater level may be desired in other metals to provide a specific machinability or abrasion resistance characteristic.

It has been found and actually confirmed by destructive analysis and inspection of sample specimens that non-metallic inclusions can be detected by the ultrasonic testing system of the present invention utilizing a comparatively high ultrasonic signal frequency in the range of two to five megacycles, although frequencies of up to ten megacycles may provide tolerable results. The discovered population and size levels are then used to provide a reliable "cleanliness" assessment of raw materials in a manner to be explained later herein.

Returning now to FIGURE 3, the present system separates the signals from the monitor gates 60–63 into a plurality of size range categories and maintains a running count of the number of discontinuities in a given size range discovered by each transducer at a given depth zone level. The illustrated embodiment uses only a single size measuring network 86 to sort the signals from all of the monitor gates, therefore, it is necessary that the signals from the monitor gates be individually applied to the network 86 and translated to the appropriate counter before a signal from a second monitor gate is applied to the measuring network 86.

To this end, the four monitor gates are selectively coupled to the network 86 by timing means comprising, in the present imbodiment, four monostable timing multivibrators 88–91 coupled in series succession from the rate generator 52. Assuming that an ultrasonic transmit-receive operation is completed during the positive half-cycle of the rate generator 52, the commencement of the negative half-cycle may be conveniently employed to trigger the lead multivibrator 88 to an on condition through a conventional differentiator input circuit including a capacitor 92. The succeeding multivibrators are likewise connected through conventional differentiator circuits represented in part by the illustrated series capacitors. Thus, a brief triggering pulse of proper polarity is applied to a succeeding multivibrator on shut-off of the prior timing circuit. The foregoing action provides four time spaced gating signals at the outputs of the respective multivibrators as represented in the drawing by the notations "Delay $1a$" through "Delay $2b$."

The foregoing time spaced multivibrator signals are coupled as inputs to respective multiplexer circuits 98–101; the multiplexers receive second inputs from respective scaling and offset amplifiers 75–78. Each multiplexer circuit is of conventional construction and each is operative to provide an output signal to a common output bus 110 proportional to the product of its two inputs. Assuming that the signal inputs from multivibrators 88 and 91 are either unity or zero depending on whether the multivibrator is on or off, respectively, the signal information in each of the monitor gates $1a$ through $2b$ is successively and individually coupled to the common output bus 110.

The output bus 110 is coupled by a common input lead 111 to three voltage comparator units 115–118 of the size measuring network 86. The voltage comparators each receive a reference voltage input of appropriate magnitude from respective taps of a series voltage divider network connected between opposite terminals of a reference voltage source 119. For example, the reference voltage for the comparators 115–118 may be respectively three volts, two volts, one volt and zero volts. The voltage comparator 115 includes a pair of output terminals labeled respectively, $C_4$ and $\overline{C_4}$, the signal levels thereon denoting respectively that the input signal voltage to the comparator is greater than or less than its reference voltage. The remaining voltage comparators are provided with similar output pairs and the signal levels persist at the output for the duration of the input signal on bus 110.

The three comparators thus cooperate to define three voltage ranges, namely, zero to one volt, one to two volts and two to three volts. A fourth range of indefinite extent may be defined as all signals exceeding the three volt reference level of comparator 115. Alternatively, signals exceeding this level may be used to actuate an alarm circuit 114 coupled to the $C_4$ output terminal of comparator 115. It is anticipated that signals of a sufficient amplitude to actuate alarm circuit 114 would be indicative of discontinuities of such magnitude as to require immediate rejection of the specimen for the particular application.

Although only four voltage comparators defining three count categories and an alarm category are illustrated in the present embodiment for the sake of simplicity, it should be understood that in practice a substantially greater number of count categories are used to provide a more detailed indication of the sizes of the detected discontinuities. For instance, in one embodiment which was actually constructed the discontinuities were segregated into sixteen size categories.

The present system develops a position indication by providing a separate bank of counters for each zone level (i.e. monitor gate), of each transducer. Specifically, the present system is provided with twelve individual counters 120–131 which may be divided into four banks of three counters each. The banks are coupled to the size measuring network 86 in a successive time sequence corresponding to the sequence of coupling the monitor gates 60–63 to the comparator network 86. Each bank includes a full complement of counters and the one counter in each bank corresponding to the size category signal then being coupled from an associated monitor gate is incremented one unit. For example, it will be observed from the drawing that each of the counters bears an indication such as "$1a$-3" of counter 120. The designation "$1a$" denotes that this counter only considers signals from the monitor gate $1a$ while the expression "3" indicates that this counter only records discontinuities in size category three.

The timing means for successively enabling the four counter banks includes a series of and gates 135–146. The and gates each include a single output terminal coupled to an associated counter and three input terminals which, in accordance with conventional logic notation, must each carry a like signal indication to provide an output from the and gate to increment the counter. Considering by way of example the and gate 135, it will be observed from the drawings that this gate is coupled to the "Delay $1a$" output of timing multivibrator 88 through a differentiation network represented in part by the input capacitor 150. This differentiation network is such as to provide a momentary pulse to the counter 120 having at least a brief time domain overlap with the terminal portion of the on period of the timing multivibrator 88. Thus, it will be recognized that the only possible interval during which and gate 135 may be operated corresponds to the time when the information from the monitor gate 60 is likewise connected to the voltage comparator network through the multiplexer gate 98.

The and gate 135 is provided with two further inputs exclusively representative of size of the detected discontinuity. These inputs are respectively $\overline{C_4}$ and $C_3$ thereby enabling and gate 135 only if the detected voltage level lies within the 2 to 3 volt range cooperatively defined by comparators 115 and 116. Two other and gates, namely and gates 136 and 137, are also conditioned to respond during the interval "Delay $1a$." The size range input to these gates are respectively in the one to two volt and zero to one volt size range categories.

Before considering the overall operation of the system of the present embodiment, it is helpful to first acquire a more precise understanding of the manner in which the transducer scanning operation divides the metal specimen to a series of incremental volume elements and zone levels within these elements as well as the metallurgical considerations which dictate the regions of the metal specimen to be inspected. Referring first to FIGURE 4a, the metal specimen 50 and the transducers 48 and 49 are represented in a semi-diagrammatic form. For convenience of explanation, it is assumed that each of the transducers is of a rectangular outline and transmits ultrasonic energy along lateral boundaries which are coextensive with the lateral limits of the transducer, as schematically represented by the lines vertically descending from the edges of the transducer into the body of the specimen 50. These lines define respective rectangular incremental volume elements within the body of the specimen into which ultrasonic energy is transmitted during the course of an on period of pulsers 46 and 47, respectively. The two shaded regions beneath transducer 48 are representative of the monitor gate levels 1a and 1b while the shaded areas beneath transducer 49 correspond to the monitor gate regions 2a and 2b.

The transducers 48 and 49 longitudinally scan the length of the specimen 50 and then are indexed laterally to transverse an adjacent longitudinal path on their reverse movement in an interlaced scanning pattern. In this manner, the multiple transducers 48 and 49 will cooperate to jointly inspect the desired portion of the specimen in one-half the time of a single transducer. Of course, the number of transducers may be increased to any convenient grouping.

It should be recognized that it is not necessary to inspect the entire volume of the metal specimen to arrive at an accurate indication as to the effect of the discontinuities upon certain physical properties of the specimen. In fact, such a complete inspection of the metal specimen may actually provide an erroneous or misleading indication of the physical properties of the specimen. For example, if the center region of the metal specimen is to be bored out in the process of making a hollow tubular strut for an aircraft, no purpose is advanced by inspecting the center region of the specimen. Hence, the scanning pattern of FIGURE 4a is advised for the above illustration.

On the other hand, if the central region of the metal specimen is the sole or predominant region of interest, then only the central zone level is inspected, as shown in FIGURE 4b. The depth thickness of the zone level may also vary over a wide range with the optimum depth thickness being determined empirically according to the expected population of discontinuities in the region of interest and the accuracy with which a given discontinuity can be expected to represent the properties of its volume region. However, regardless of the particular depth region inspected, the present invention in all instances contemplates the taking of a large number of individual samples as a basis for a statistical analysis or other meaningful data presentation of the overall quality of the specimen.

The inspection of only a single depth zone level in each incremental volume element also permits a considerable simplication of the amplitude correction circuits 70 and 71. Under these circumstances, a simple potentiometer gain control may be used to set the output signal from the receiver to a reference level in response to the reflected wave energy from a calibration specimen and the correction process is completed.

Referring again to FIGURE 3 and to the waveform chart of FIGURE 5, the overall system operation is as follows. Closure of the manual start switch 53 initiates relative movement between the transducers 48 and 49 and the metal specimen 50 through conventional scanning apparatus (not shown). Closure of this switch also coupled the rate generator to the pulsers 46 and 47 to result in the periodic excitation of the transducers 48 and 49, as previously explained. Typically the repetition frequency of the rate generator is in the range of 750 to 2000 cycles per second; one cycle of the rate generator signal is represented in FIGURE 5a. The identical pulser units 46 and 47 concurrently respond to initiation of each positive half-cycle from the rate generator 52 to coincidentally excite their respective transducers 48 and 49 to periodically transmit ultrasonic signals falling within the preferred 2 to 5 megacycle frequency range into the body of the specimen.

The resulting ultrasonic wave energy signals are represented in FIGURE 5b. The first signal pulse 160 is coincident with the leading edge of the positive half-cycle of the rate generator signal and is representative of the transmission pulse from the transducers 48 and 49. The second pulse 162 of a slightly reduced amplitude is representaitve of the energy reflected from the metal specimen-fluid couplant interface. Consistent with conventional practice either of the pulses 160 or 162 is used as a timing or reference signal for the amplitude correction circuits 70 and 71; and the timing circuits of the monitor gates in the present embodiment the pulse 160 is selected as the reference pulse. The last pulse 164 on the time scale of FIGURE 5b is the energy reflected from the bottom surface of the specimen 50. Thus, all of the reflected energy has traversed the thickness of the metal specimen and been reflected back to transducer elements well in advance of the end of the positive half-cycle of the signal from the rate generator 52.

Intermediate the front and rear interface reflection the horizontal reference line in the time scale has been recessed in two places. These recessed portions represent the time periods during which the monitor gates 60-61 and 62-63, respectively are conditioned to pass reflected wave energy signals. The peak amplitude signals 166 and 168 during these respective time intervals are temporarily stored in the peak sample and hold circuits of the respective monitor gates. These signals are held by the monitor gates until an associated multiplexer permits this signal energy to be coupled to the size measuring network 86.

It will be recalled that the multiplexers 98–101 are gated to an on condition in successive non-overlapping time intervals. The timing sequence for the multiplexers is established by the timing multivibrator series 88–91. The output pulse 170 of the timing multivibrator 88 is illustrated in FIGURE 5c while the differentiated pulse input applied to the succeeding multivibrator 89 and the and gates 135, 136 and 137 is illustrated in FIGURE 5d. As shown, the pulses 170 and 172 overlap in time to at least a small degree; however, the output signal 174 (FIGURE 5e) of the succeeding multivibrator 89 is spaced subsequent in time to the pulse 172. Operation of the remaining multivibrators of the timing network is identical.

Hence, application of the signal 170 to the multiplexer 98 permits signal current to temporarily flow from the sample and hold circuit of the monitor gate 60 to the common input lead 111 of the size sorting or measuring network 86. Assuming that the input signal amplitude to the voltage comparator network lies within the range between the reference voltages applied to comparators 115 and 116, the output signal carried on terminals $\overline{C}_4$ and $C_3$ will be of a polarity to operate the and gate 135. The concurrent presence of the Delay 1a triggering pulse on the and gate 135 completes the signal set required to enable the and gate 135 and, hence, the counter 120 is advanced by one unit.

In accordance with the present invention, the data recorded by the counters is now interrelated to ultimately develop output information which is a reliable indicia of the collective or sum effect of the measured discontinuity characteristics on given bulk physical properties of the specimen. Exemplary ways of handling this data to provide such an indication are disclosed in detail in connection with an explanation of the next embodiment of the invention to be presently considered. Briefly, however, the size range information (and location information, if desired) disclosed by each counter is separately encoded as input information to a computer. The computer is also provided with input information in the form of reference data which correlates the effect of individual discontinuities of the particular size range (and indicated location) on the physical properties of a metal specimen. These weighted size range signals are then collectively summed to provide a net output quantity which characterizes the collective effect of the measured discontinuities on the physical properties of the specimen. The foregoing reference data, as will be explained in greater detail later herein, is generated by empirical testing of metal specimens of known discontinuity characteristics.

If the position indication of the present embodiment is deemed unnecessary, it will be recognized that only one bank of counters is needed to provide the completed size information and that the gating circuitry preceding the counters may also be materially simplified. Furthermore, the relative weighting of the discontinuity representative signals according to their proportional effect on the selected physical property of the specimen may be simply made by proper adjustment of the values of the voltage divider resistors coupled to the reference supply 119.

Figures 5, 6:
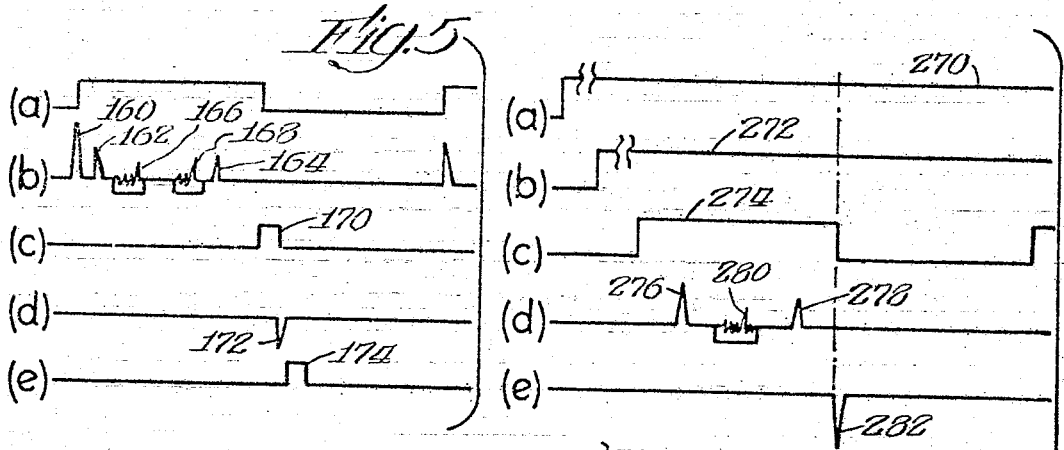
FIGURE 5 is a representation of various electrical signals useful in understanding the operation of the circuit of FIGURE 3.
FIGURE 6 is a diagrammatic representation of yet a further embodiment of the invention in which the ultrasonic inspection system is uniquely integrated with a digital computer.

A further embodiment of the present invention is illustrated in FIGURE 6. This embodiment uniquely integrates the ultrasonic detection system with a digital computer for analyzing and processing the accumulated ultrasonic inspection data to provide an information print out in a form which accurately and meaningfully characterizes or quality grades physical properties of the specimen according to discontinuity content.

Referring now to FIGURE 6, the system there shown is generally similar to that illustrated in FIGURES 1 and 2 excepting that the present system is integrated with a digital computer rather than the analog computer 17 of the earlier construction. Specifically, the present system comprises an immersion tank 180 having a metal specimen 182 submerged therein under a column of fluid couplant generally indicated by the reference numeral 184. The tank 180 is provided with guide tracks 186 and 188 running along the upper edges of its opposite lateral sides to thereby slidably support a bridge 189 adapted to move relative to the tank 180 along the course of the parallel guide tracks.

The bridge 189 in turn supports a carriage mechanism 192 adapted for reciprocating movement between the opposed ends of the bridge. The carriage, in the present embodiment, supports a singular ultrasonic transducer 194 which is similar to the transducers of the prior embodiments.

The transducer 194 is moved or scanned relative to the specimen by conventional drive motors and control circuits within the block 196. Specifically, the carriage 192 is driven in a reciprocating motion between opposite ends of the bridge 189 while motor control circuits within the block 196 are effective to slow the carriage, reverse its movement and index the bridge 189 laterally by a small increment each time the carriage approaches an end of the bridge. The scanning cycle is initiated by closure of a start switch 200 for the drive motors and continues automatically thereafter. Further details of a suitable carriage and bridge scanning mechanism and the drive control apparatus therefor are illustrated in Patent No. 2,989,864.

Like the prior embodiments disclosed herein, the present construction includes a rate generator 204 for periodically conditioning a pulsing unit 206 to excite the transducer 194 at the preferred 2 to 5 megacycle frequency. Similarly, the transducer 194 is coupled to a receiver network 208 and to a monitor gate 210. As is conventional the receiver 208 includes a multiple stage narrow band radio frequency amplifier 212 having a center tuned frequency equal to the resonant frequency of the pulser 206, a diode amplitude modulation detector 214 and a radio frequency filter 216.

The output of receiver 208 is an electrical signal having a time varying amplitude envelope proportional to the amplitude of the reflected ultrasonic wave signal energy from within the body of the specimen 182. This signal is applied to a multiplexer block 218 of the monitor gate 210. The multiplexer 218 receives a second input from a monostable multivibrator 220 which is designed to apply a unity signal to the multiplexer during its on period and a zero signal thereto when it is in an off condition. As is well known, the multiplexer 218 is in effect a product amplifier and, accordingly, its output signal under the present circumstance corresponds to a time gated portion of the time varying amplitude envelope at the output of receiver 208.

The on or timing interval of the monostable multivibrator 220 is established by a triggering signal from the rate generator 204 through a series monostable multivibrators 224 of the monitor gate. The rate generator 204, on each recurrent positive half-cycle, simultaneously triggers the pulser unit 206 and the monostable multivibrator 224 to operative conditions. The time constant of the multivibrator 224 defines the depth within the specimen 182 at which the gating interval is commenced while the time constant of multivibrator 220 determines the zone thickness.

The monitor gate 210 further includes a peak sample and holding circuit connected to the output of the multiplexer 218. Typically circuit 218 includes a capacitor which charges to the peak value of the signal passed by the multiplexer during its time gating interval. The circuit 226 is again coupled to a conventional scaling and offset amplifier 228 for matching the zero point and scale range of the ultrasonic detection apparatus to that of the digital comparator or processing apparatus which follows. A conventional analog to digital converter 229 is connected to the scaling amplifier 228; the converter 229 presents a binary output which is retained until displaced by a succeeding input signal from the amplifier 228.

The remaining apparatus of the embodiment of FIGURE 6 is provided for uniquely integrating and coordinating the operation of the ultrasonic inspection system with that of the data processing unit to provide a fully automated system of inspecting and quality classifying metal specimens. Specifically, this latter portion of the system includes a digital computer 230 for interrelating the information assembled therein during the course of a scanning cycle to develop, through a data print out unit 232, information which metallurgically characterizes a metal specimen according to non-metallic inclusion content or the like. Two exemplary forms of data print out will be discussed in detail later herein.

The digital computer 230 is of a conventional type and in one constructed embodiment, of the invention a Model PDP-8 Digital Computer manufactured by the Digital Equipment Corporation. The computer 230 is here programmed such that acceptance of data from the ultrasonic system is only initiated on a predetermined signal from this system and thereafter the computer 230 is periodically conditioned to accept data only on instruction from the ultrasonic system.

Since the data produced while the carriage mechanism 192 is slowing and reversing its direction of movement is subject to inaccuracies due to changes in the scanning rate, the computer 230 is further instructed not to accept data during these time periods. At the end of the entire scanning cycle, the computer 230 is instructed to process the assembled data from the sampled volumetric elements of the specimen 182 and to print the results through the print out unit 232.

Figure 7:
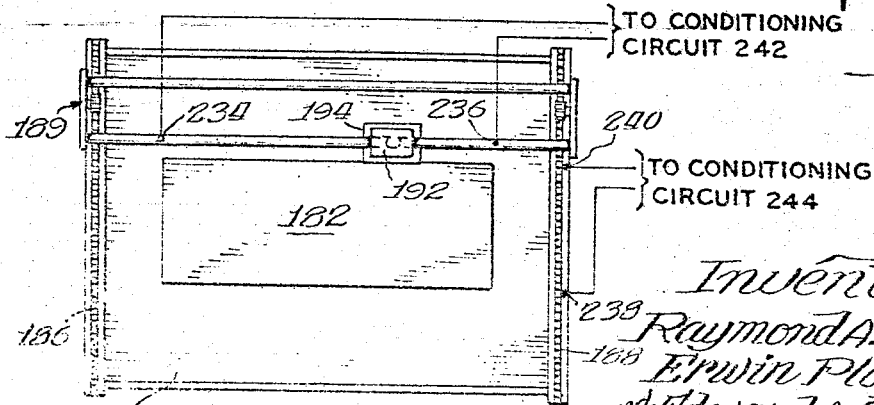
FIGURE 7 is a plan view of the immersion tank and transducer bridge-carriage mechanism of FIGURE 6.
Figure 6:
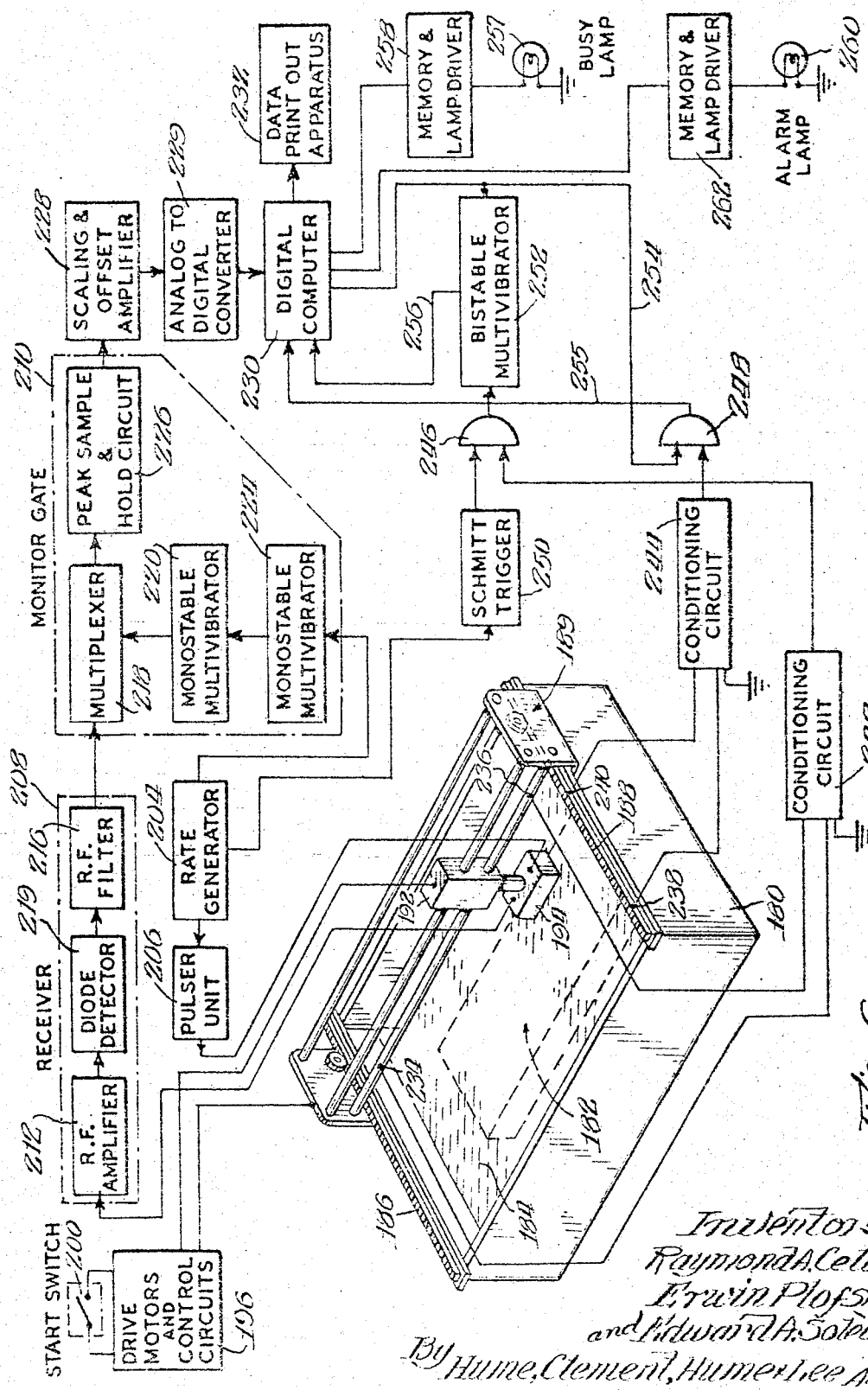

To accomplish the foregoing, the present system includes sensing means responsive to the position of the scanning element or transducer 194 relative to the metal specimen 182 for permitting data to be translated from the transducer to the computer 230 only when the transducer 194 is within predetermined space limits relative to the specimen. In the present embodiment, the sensing means includes a pair of contact switches 234 and 236 positioned near opposite ends of the bridge 189 and a second pair of spaced contact switches 238 and 240 supported on the immersion tank 180 along the path of movement of the bridge 189. The contact members 234 and 236 are adapted to engage complementary contacts on the bridge 192 to provide a signal indication to a conditioning circuit 242. Similarly, the contacts 238 and 240 are adapted to engage respective complementary contacts on the bridge 189 to provide a signaling indication to a conditioning circuit 244. The spacing between the respective sensing contact pairs is adjustable to define any lateral scanning dimensions desired. A view of the contact pairs positioned at the lateral limits of the specimen 189 is shown most clearly in FIGURE 7.

The conditioning circuits 242 and 244 are of identical, conventional construction. Each circuit is responsive to a closure of one of its pairs of input contacts to shift between a first and second bias level and for this purpose may include a bistable multivibrator conditioned to change states with each contact closure. For instance, assuming the carriage 192 is positioned intermediate contact pairs 234 and 236, the output of conditioning circuit 242 is of a character to operate the succeeding and gate 246. However, as the contact 234 and its complementary carriage contact momentarily close, the output signal of conditioning circuit 242 shifts to a bias level for inhibiting the and gate 246. The inhibiting signal persists until the carriage 192 reverses its direction and again momentarily engages the contact 234 as it re-enters the scanning zone; at this time, the conditioning circuit 242 returns to its original operating condition and restores an operating signal level to the and gate 246. The conditioning circuit 244 operates in similar fashion to apply an operating signal level to the and gate 248 only when the bridge 189 is within the lateral limits of the contact pairs 238 and 240.

The and gate 246 also receives periodic input pulses from a conventional Schmitt trigger 250 at a repetition rate determined by the rate generator 204 and in a phase coincidence with the commencement of the negative half-cycle of the rate generator signal. Thus, the output signal of the and gate 246 is a recurring pulse synchronized to the rate of transmission of ultrasonic signal energy; the pulses cease, however, when the carriage mechanism 192 leaves the scanning zone.

The aforesaid pulse signals are used to synchronize the rate of assimilation of information by the digital computer 230 to the rate of development of information by the ultrasonic inspection system when the transducer is moving within the preselected scanning zone. To this end, the output signal of the and gate 246 is applied to one input of a bistable multivibrator 252 so as to periodically reset the multivibrator 252 to a reference condition.

The nature and programming of the computer 230 is such that access may be had to its memory storage unit only during periodic time intervals. These time intervals correspond to signal pulses carried on an output line 254 of the computer. The output line 254 is coupled to a "set" input of the bistable multivibrator 252 and, assuming that the output signal from the and gate 246 has "reset" this multivibrator, than the "set" signal will cause a signal pulse to return to the computer 230 along the output line 256 of the multivibrator. On the other hand, if the and gate 246 fails to provide a reset pulse to the multivibrator 252, the pulses carried by the line 254 are ineffectual to alter the state of the multivibrator 252 and no return pulse is provided on the line 256.

The presence of a return pulse on the line 256 informs the computer, at a suitable point in time, that discontinuity information from a transmit-receive interval is available at the analog to digital converter 229. The computer responds by accepting this information into its own memory storage unit. The computer than returns to its normal data processing cycle which it will only again interrupt in response to a signal on line 256.

The digital computer 230, must also be informed of the commencement and termination of a complete ultrasonic scanning cycle so that the sum of the collected information may be properly processed and interrelated to provide the desired output through the data print out apparatus 232. In the present embodiment, a complete data gathering or scanning cycle involves movement of the bridge 189 between opposite lateral sides of the specimen 182. Thus, assuming the bridge to move from left to right, the beginning of the scanning cycle is signaled by closure of the switch contact 238 and the completion of the cycle is denoted by closure of the contact 240. The period during which the bridge 189 is between the contact pairs 238 and 240 is known as the occupancy interval and during this time computer 230 merely assimilates incoming information and continually updates its numerical calculations to the extent possible with only partial data accumulation. Closure of the switch contact 240 by the complementary bridge contact signals the end of the data gathering cycle and causes a disabling signal to be applied to the and gate 248 through the conditioning circuit 244.

Again, the central data processing center of the computer 230 is only receptive to signals received during appropriate time intervals as denoted by the pulses carried on output line 254. Hence, the and gate 248 receives a second input from the line 254. The output of the and gate 248 is returned to the compter 230 along a line 255; upon completion of the occupancy cycle the computer 230 senses the absence of periodic pulses on the line 255 and responds by diverting the computer to an appropriate subroutine which carries instructions as to completion of the numerical calculations on the accumulated data. The processed information is then presented in a preselected format through the data print out apparatus 232.

During the time interval that the computer 230 is completing its final calculations, it is not capable of receiving further input information. The system operator is appraised of this condition by a busy lamp 257 which remains lit for the duration of the calculating interval by virtue of a signal received along another output line of the computer through a memory and lamp driver circuit 258.

An additional output line of the digital computer 230 is connected to an alarm lamp 260 through a memory and lamp driver circuit 262, similar in construction and operation to the circuit 258. The alarm lamp 260 is designed to light only if the completed data calculation reveals that the quality of the examined specimen is poorer than the minimum acceptable grading classification previously set for this material. Preferably, the alarm lamp 260 remains lit until manually reset by the operator and the system is inhibited from further operation until such reset is accomplished.

In explaining the operation of the present embodiment of the invention, it will be assumed that the carriage 192 is initially positioned to move into the scanning zone through the contact 236 and that the bridge 189 resides in an initial position at the forwardmost edge of the scanning zone such that the bridge contact has just effected closure of the occupancy contact 238. It is further assumed that the ultrasonic inspection system is in an on condition by closure of start switch 200 and that ultrasonic signals are being transmitted from and received by the static transducer 194. Although the reflected wave signal energy is conveyed through the ultrasonic inspection system to the converter 229, the information is not provided access to the digital computer 230 because the inhibiting signal from conditioning circuit 242 precludes the Schmitt trigger 250 from resetting the bistable multivibrator 252 through the and gate 246. Hence, the periodic signals from the output line 254 of the computer are not effective to change the state of the multivibrator 252 and, accordingly, no signal instruction is returned to the computer 230 along the line 256 which directs the computer to accept data from the converter 229.

Closure of the start switch 200 under the foregoing circumstances, also causes the carriage 192 to accelerate to a preselected constant speed as it moves toward the opposite end of the bridge 189. The contact 236 is so located relative to the initial position of the carriage 192 that the carriage has reached its constant speed prior to intercepting the contact 236. The contact 234 is likewise positioned relative to the end of the bridge 189 so that the carriage passes this contact at a constant speed; the slow down, reversal and reacceleration of the carriage to its constant speed occurs entirely outside of the scanning zone. This assures a uniform sampling rate across the entire specimen zone of interest which is basic to an accurate statistical analysis of the sample specimen.

In continuing the explanation of the circuit operation, it is helpful to refer to the various signal waveforms of FIGURES 8a–8e which are all plotted along a common time scale. The portion 270 of the waveform of FIGURE 8a indicates the enabling bias level applied to the and gate 248 from the output line of the conditioning circuit 244 when the bridge 189 is within the lateral limits of the scanning zone. This signal denotes that the occupancy condition exists and the computer is so informed through the and gate 248. Movement of the carriage 192 past the contact 236 and into the scanning zone provides an enabling signal to the and gate 246 through the conditioning circuit 242, as represented by the portion of the signal waveform 272 illustrated in FIGURE 8b. Both inhibiting signals have now been removed from the and gates 246 and 248 so that the ultrasonic inspection-computer system are in a free running condition.

The next positive half-cycle 274 of the recurring signal waveform from the rate generator 204 is shown in FIGURE 8c; the indefinite time succession of the occupancy and carriage scanning conditions relative to one another and the pulse 274 is denoted by the broken portions of the time scales for these waveforms. The commencement of the positive half-cycle 274 of the rate generator signal actuates the pulser unit 206 to apply a momentary high frequency signal in the range of 2–5 megacycles to the ultrasonic transducer 194 as well as concurrently initiating the timing interval of the monostable multivibrator 224 of the monitor gate 210.

A portion of the signal information reflected from the internal volume of the metal specimen 182 as a result of excitation of the transducer 194 by the signal 274 is indicated in the wave diagram of FIGURE 8d. The first of the signal waveforms 276 of this figure represents the energy reflected by fluid couplant-metal specimen interface while the last of the signal pulses 278 represents the energy reflected from the lower surface of the specimen. Intermediate the top and bottom surface pulses 276 and 278 the reflected wave signal energy is representative of the size of detected discontinuities within the volumetric element encompassed by the transducer 194. As with the earlier systems described herein, only a limited depth zone of the volumetric element inspected by the transducer 194 is used to provide a discontinuity size sample. Accordingly, for convenience and clarity in the drawings, only the reflected wave signal energy 280 for this time interval has been illustrated in FIGURE 8d. However, it will be recognized that all of the reflected wave signal energy is amplified and detected by the receiver 208 and that the time varying amplitude envelope thereof is applied as an input to the monitor gate 210.

The series monostable multivibrators 224 and 220 are triggered into successive conduction from the rate generator 204 to apply an on or gating signal to the multiplexer 218 only for the interval corresponding to the desired information period 280 of FIGURE 8d. The peak sample and hold circuit 226 of the monitor gate records the peak amplitude signal received during the gating interval. This signal is passed through the scaling and offset amplifier 228 to the analog to digital converter 229. The converter 229 develops in a series of output "flip-flops" the binary equivalent of the analog input signal. The converter 229 is capable of storing the applied input signal until a succeeding input is applied thereto. Accordingly, the digital computer 230 must accept the binary coded signal from the converter 229 prior to the next transmit-receive interval of the ultrasonic inspection apparatus. For this purpose, the Schmitt trigger 250 is synchronized from the rate generator 204 to provide an output pulse 282 of FIGURE 8e which is in time coincidence with the trailing edge of the positive half-cycle of the rate generator waveform 274 of FIGURE 8c. This momentary pulse is passed by the and gate 246 to reset the multivibrator 252. Thus, the next succeeding pulse on the output line 254 of the computer is effective to "set" the bistable multivibrator 252 and provide a return signal indication to the computer 230 on the line 256 which instructs the computer to read the signal stored in the converter 229.

The foregoing steps are repeated once during each cycle of the signal from the rate generator 204 and the computer 230 continues to individually accept information from each sampled volume zone until the carriage engages the far contact 234. The drive motors and control circuits within the block 196 then slow the carriage 192, reverse its direction and reaccelerate it to its constant preselected speed as it now again approaches the contact 234. As the carriage again passes the contact 234, the inhibiting signal is removed from the and gate 246 and operation of the circuit is resumed in a normal manner. This operating pattern continues until the bridge 189 is ultimately indexed to a position to effect closure of the contact 240 thereby inhibiting the and gate 248.

The digital computer 230 is programmed so that the termination of output signals from the and gate 248 is interpreted as a signal to complete the numerical analysis of the accumulated information and to print out this information in a preselected format via print out apparatus 232. The busy lamp 256 also lights to warn the operator that the computer is performing calculations and that further information will not be accepted by the computer until such calculations are completed.

At this stage of the explanation, it is appropriate to consider the manner in which the digital computer 230 operates on the accumulated information to arrive at a quality grading or indexing of the examined specimen 182. In this regard, it should be recalled that the present embodiment is designed to record only the largest size discontinuity in each of the sampled volumetric zones; up to 100 million or more of such individual zones may be inspected throughout the body of the metal specimen to provide a broad sampling on which to base statistical predictions as to the quality. In this regard, it has been found through extended empirical study and analysis that reading of only the largest size discontinuity within each sample volume zone provides a satisfactory basis on which to accurately predict the properties of the material even though a large number of smaller discontinuities may exist in the sample zone. It is presently believed that this accuracy is attributable to the fact that the largest size discontinuity exercises a predominant influence on the physical properties of its zone.

Of course, the number of uncounted discontinuities in each zone is progressively decreased as the volume of the zone approaches zero and the accuracy of the statistical prediction is likewise progressively increased with decreasing volume of each sample zone. The same total sampling volume is maintained by increasing the number of samples. Recognized mathematics of statistics and probability as well as experience will dictate the numerical quantity and optimum sample zone size required for metal specimens of a given type in order to predict the properties of the specimen within suitable accuracy limits. It is also recognized that the practical limits of time and economy are of significance in determining the number of sample volumes to be inspected in each specimen.

Figure 12:
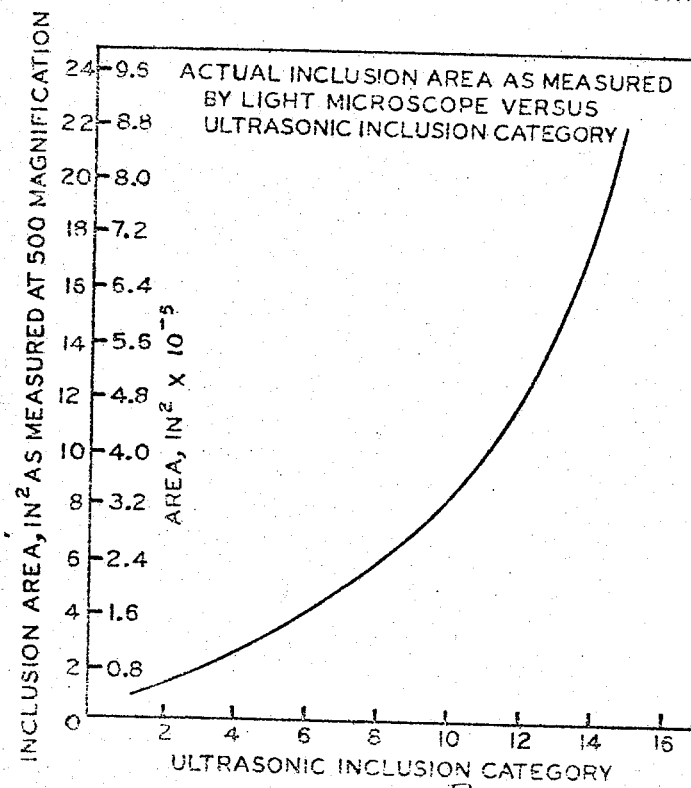
FIGURE 12 is a graph depicting actual inclusion area as measured by a light microscope versus ultrasonic inclusion size range category, as actually detected and measured by a system of the present invention.

At any rate, regardless of the exact numbers of individual samples taken, it is contemplated by the present invention that the detected discontinuities be divided into a plurality of groups or categories according to at least the parameter of size. Specifically, the computer 230 after recording each input signal from the converter 229 in its memory storage unit effects a comparison of the amplitude of this signal against a series of reference signal amplitudes to effect a size classification. The computer then increments the storage address for that class or category by one unit. A plot of actual non-metallic inclusion area as measured by a light microscope versus category size for the sixteen size categories of one actually constructed and operated system of the invention is shown in FIGURE 12.

Figures 9, 10:
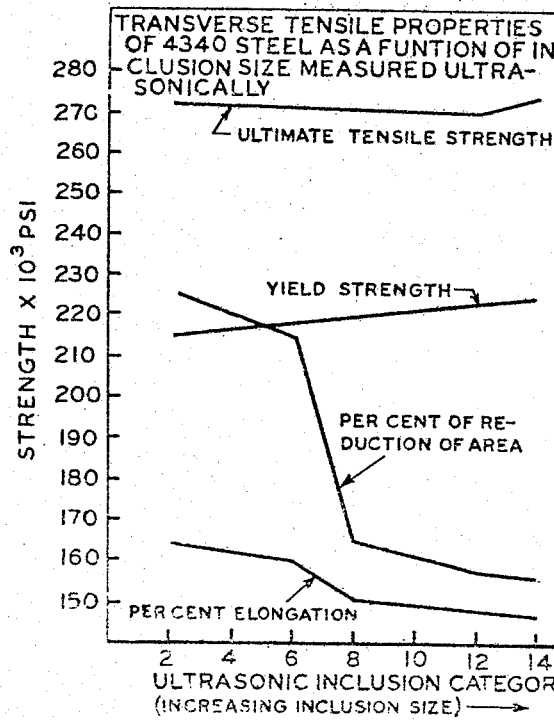
FIGURE 9 is a representation of a typical computer output format provided by the computerized system of FIGURE 6.
FIGURE 10 is a graph depicting the relationship of certain physical properties of one type of steel as a function of discontinuity size.

The further operations of the computer on the accumulated data may best be understood by reference to the preferred data print out format of FIGURE 9. The upper portion of the print out within the dotted outline 286 provides space for identifying the metal specimen, the region therein inspected, etc. The lower portion of the print out is divided into five columns, the first of which is size range category. In the present arrangement, there are sixteen size range categories indicating that the computer has been provided with reference data to effect a division of the signal amplitude scale into sixteen equal increments. The number of counted discontinuities in each of the sixteen size categories is listed adjacent that class in the second column entitled "Count." As shown, the bulk of the counts are concentrated in classes 2-6; no discontinuities were detected in any of the size range categories 10-16. The number of counts listed is purely arbitrary and should not be interpreted as representing the results of an actual inspection.

The total number of counts is equal to the total number of individual sample volumes inspected within the specimen; this number may, of course, vary at the whim of the operator. Hence, it is the frequency or percentage of counts in each category relative to that in all other categories that is of primary interest. It is this relative percentage that is listed for each category in the column entitled "Freq."

It has been found that discontinuities of differing sizes have different effects on the physical properties of a metal specimen. This effect varies as a function of both the type of metal and the physical property thereof which is considered. Thus, it is necessary to develop and equip the computer with a body of reference data which correlates category size to the relative effect of discontinuities in that category on the physical properties under consideration. In the table of FIGURE 9, it is assumed purely by way of example that discontinuities in each successively higher category are twice as significant as those of the preceding category in terms of affecting the selected physical property of the specimen. Accordingly, a set of weighting factors consistent with this assumption are listed for the respective categories in the fourth column entitled "P. Fact."

The product of the weighting factor for each category and the frequency of occurrence of counts in that category provides a product indicative of a net effect of the counts in each category on the selected physical property relative to the effect of the counts in each of the other categories. These product factors are listed in the fifth column entitled "Prod." The numerical sum of all of the numbers in this fifth and final column provide an indication of the total or net effect of inclusions of all of the size range categories on the selected physical property of the specimen; in the present case, the total sums to a calculated index of 6.0 listed at the bottom of the figure. The calculated index is again a relative indication and must be compared to some reference chart or graph which defines a numerical value for the selected property as a function of the calculated index.

The print out format of FIGURE 9 also includes a stored index, in this case 1.5. This stored index represents the maximum index value any specimen may have and still be suitable for the application at hand. Since in the present case the calculated index exceeds the stored index, the computer 230 will cause the alarm lamp 260 to light. The operator is thus informed to reject this specimen. If the calculated index has been less than 1.5, then the inspected specimens may be sorted or graded according to quality within the acceptable range. The inspection system of the present invention thus permits the designer or metallurgist to select materials of exacting standards for a given application.

The development of reference data for each of the count categories is essential to give proper analysis of the specimen. This reference data is generated by empirical analysis and testing of sample specimens. For example, a small specimen segment in which a singular size category discontinuity predominates, is tested by conventional methods to determine maximum tensile strength, ductility and other physical properties in accordance with well known testing techniques. Further samples in which discontinuities in each of the remaining size ranges predominate are similarly tested and a graph of discontinuity size category versus the selected physical property is developed.

A graph developed by the foregoing empirical methods which plots various transverse tensile properties of AISI 4340 steel standards as a function of discontinuity size category is shown in FIGURE 10. As noted from this graph, the effect of discontinuity size varies markedly depending upon the physical property under consideration. Certain physical properties, as ultimate tensile strength are substantially independent of discontinuity size while the percent of reduction of area curve varies rather sharply according to discontinuity size. The data from the graph of FIGURE 10 is readily converted into weighting factors denoting the relative effect of each inclusion category on the physical property under consideration. For example, on the percent of reduction of area plot, it can be seen that category 8 inclusions have a much greater influence on this property of the steel than do category 2 inclusions and the assigned weighting factors for these inclusion categories would proportionally reflect this difference.

The foregoing description is illustrative of one of many statistical methods by which the bulk physical properties of a metal specimen may be assigned a numerical rating representative of the quality of the specimen. It will be recognized by those skilled in the art that other statistical evaluating techniques may be used in accordance with the teachings of the present invention. For example, such size distributions may be statistically analyzed to obtain a "cleaniness" rating representative of mean inclusion size, limits of deviation from the mean, skewness and kurtosis.

Figure 11:
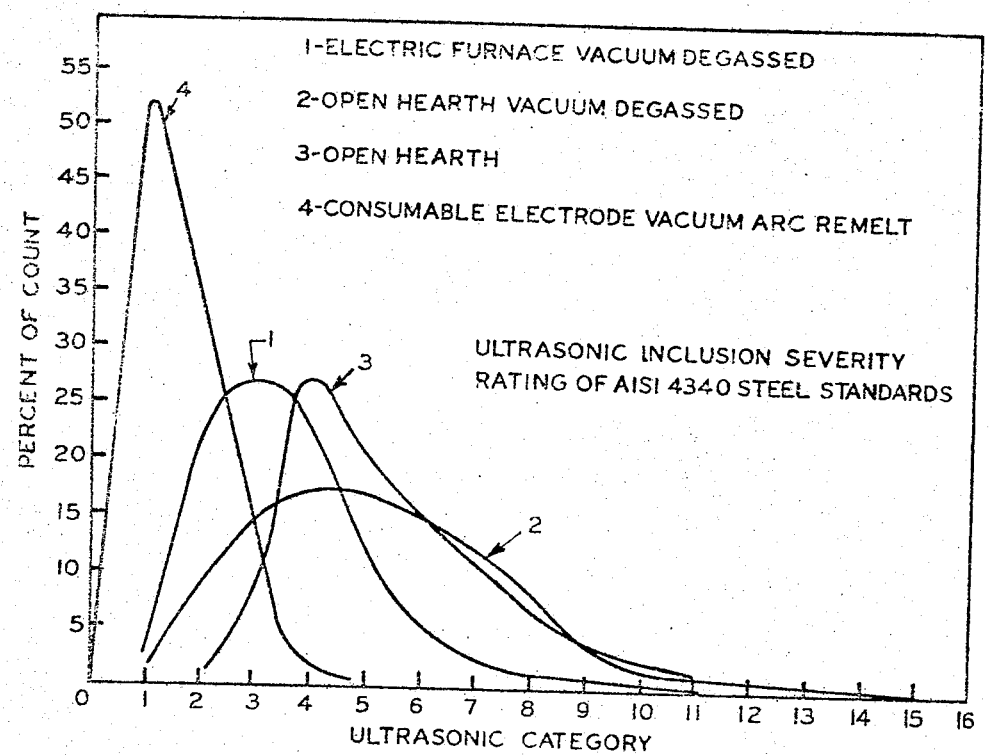
FIGURE 11 is a graph showing the percent of discontinuities in each of several size range categories as a function of category for four different types of steel.

Furthermore, other types of information displays, such as the graphical histogram plots of FIGURE 11, may be useful for certain purposes. Referring to FIGURE 11, it will be observed that the graphs of this figure plot the percent of count in each of sixteen size range categories as a function of category size for steels made by four well known processes. The graphs of FIGURE 11 were made from data actually compiled by one constructed embodiment of the invention. As is well known, the consumable electrode vacuum arc remelt method for manufacturing steel is a comparatively "clean" process and this is confirmed by the graphical plots. It should be further noted that each of the graphs is peculiarly characteristic of each type of steel.

The system described in connection with FIGURE 3 may also provide data in the formats of FIGURES 9 and 11, assuming that the readings of the individual counters are properly coded on punch cards or the like and the information fed to a suitably programmed computer. The multiple transducer and multiple gate arrangement of the system of FIGURE 3 may be integrated for automatic operation with a digital computer in accordance with the teachings of FIGURE 6. This overall combined system has not been illustrated in detail in the drawings solely for clarity in explanation and understanding of the operation of the various system portions; however, the construction and operation of such a combined system will now be readily apparent to those skilled in the art.

From the foregoing, it will be appreciated that the present invention provides a highly reliable method of and system for effecting a nondestructive, statistical evaluation of the total non-metallic inclusions and/or other similar discontinuities in homogeneous production materials such as steel, aluminum and the like. While the invention has been described with respect to its applicability to typical production situations, it will be appreciated by those skilled in the art that various modifications of the invention could be devised to adapt it for other particular uses and/or applications. Such changes and incidental modifications clearly would not constitute a departure from the invention, various features of which are set forth in the accompanying claims.

We claim:

1. A system for non-destructively inspecting a predetermined percentage portion of the internal volume of a nominally homogeneous metal specimen and metallurgically grading said specimen according to the cumulative effect of non-metallic inclusions of other discontinuities discovered within each of a series of incremental volume elements of said specimen during the course of said inspection, said system comprising:

transmitting means including a plurality of individual transducer elements each adapted for transmitting ultrasonic wave energy into a respective plurality of individual volume elements of said specimen;

receiving means for individually detecting the reflected ultrasonic wave energy signals from each of said volume elements and for converting said individually detected ultrasonic wave energy signals into proportional electrical signals;

gating means, coupled to said receiving means, for segregating said proportional electrical signals from each of said volume elements into a plurality of time zones representative of a corresponding plurality of depth zone levels in each of said individual volume elements;

peak signal responsive means for detecting the maximum amplitude electrical signal in each of said plurality of time zones of each of said volume elements which maximum amplitude signal is representative of the largest size discontinuity detected within the corresponding depth zone;

size measuring means, coupled to said peak signal responsive means, for segregating said maximum amplitude electrical signals into a plurality of categories according to relative signal amplitude;

counter means, coupled to said size measuring means, for recording a numerical indication of the total number of said maximum amplitude electrical signals within each of said plurality of categories;

and calculating means, coupled to said counter means, for relatively weighting the numerical indication of each of said plurality of categories in proportion to the relative effect of discontinuities of the size range represented by said category on a predetermined physical property of said metal specimen as determined from pre-established reference data and for effectively summing said weighted category information to calculate a relative quality grading index of said metal specimen for said predetermined physical property.

2. The system of claim 1 and further including:

rate generator means for rendering said transmitting means operative and inoperative in alternation;

and time delay means, coupled to said gating means and synchronized from said rate generator means, for sequentially applying said maximum amplitude electrical signals from each of said plurality of time zones to said size measuring means but only during the inoperative periods of said transmitting means.

3. The system of claim 2 in which said counter means comprises separate counter apparatus for each depth zone level within said specimen to thereby provide an indication of the position of said detected discontinuities within said specimen.

4. The system of claim 3 and further including sequential enabling means for successively rendering said counter apparatus for each depth zone level susceptible of effecting a counting operation in correspondence with the action of said time delay means in coupling information from that zone level to said size measuring means.

5. A system for non-destructively inspecting a predetermined portion of the internal volume of a nominally homogeneous metal specimen and electronically analyzing said specimen according to the cumulative effect of measured non-metallic inclusions or other discontinuities within said specimen, comprising:

transducer means adapted for transmitting ultrasonic wave signal energy into said metal specimen;

rate generator means for rendering said transducer means operative and inoperative in alternate time intervals;

scanning means for effecting relative movement between said metal specimen and said transducer means to permit said transducer means to transmit ultrasonic wave signal energy into a plurality of individual volume elements of said metal specimen;

receiver means for successively developing, during each inoperative time interval of said transducer means, electrical signals representative of the ultrasonic wave energy reflected from within a preselected portion of each of said individual volume elements as a result of the preceding transmitting interval of said transducer means;

analog to digital converter means for developing a binary equivalent of said representative electrical signals and for temporarily storing said binary equivalent until a succeeding operative interval of said transducer means;

digital computer means, receptive to input information from said converter means only during periodic time intervals of a repetition frequency at least as high as that of said rate generator means, for individually operating on each of said binary equivalent signals in ultimately developing output information indicative of a cumulative effect of the measured discontinuity information from each preselected portion of each volume element on a predetermined physical property of said specimen;

and actuating means, coupled to said rate generator and said digital computer, for periodically enabling said computer to accept said binary equivalent signals from said converter means only during predetermined coincident ones of the timing intervals developed by said computer means and said rate generator means.

6. The system of claim 5 and further including:

sensing means for providing a signal indication of the relative position of said metal specimen and said transducer means;

gating means responsive to a predetermined signal from said sensing means for inhibiting normal operation of said actuating means when said transducer means is beyond predetermined spaced limits relative to said specimen.

7. The system of claim 6 and further including peak signal sampling means, interposed between said receiving means and said computer means, for applying to said computer means only electrical signals representative of the maximum size discontinuity in each preselected portion of each of said individual volume elements.

8. The system of claim 7 in which said computer means is operative to segregate said maximum size discontinuity representative electrical signals into a plurality of categories according to size and is further operative to provide a graphical output of the number of detected discontinuities in each size category versus category number.

9. The system of claim 7 in which said computer means is operative to segregate said maximum size discontinuity representative electrical signals into a plurality of categories according to size and to relatively weight the numerical count of each of said plurality of categories in proportion to the relative effect of discontinuities of the size represented by said category on a predetermined physical property of said metal specimen as determined from pre-established reference data and in which said computer means is further operative for effectively summing said weighted category information to calculate a relative quality grading index of said metal specimen for said predetermined physical property.

10. A system for non-destructively inspecting a predetermined percentage portion of the internal volume of a nominally homogeneous metal specimen and electronically grading said specimen according to the cumulative effect of measured non-metallic inclusions or other discontinuities within said specimen, comprising:
transducer means adapted for transmitting ultrasonic wave signal energy into said metal specimen;
energizing means connected to said transducer means for rendering said transducer means operative and inoperative in alternate time intervals;
scanning means for effecting relative movement between said metal specimen and said transducer means to permit said transducer means to transmit ultrasonic wave energy into a plurality of individual volume elements of said specimen;
receiver means connected to the transducer means and including a plurality of gating means for developing electrical signals representative of ultrasonic wave energy reflected from a corresponding plurality of different depth portions within an individual volume element and a plurality of storage means for temporarily storing said representative electrical signals;
computer means for processing a series of individual electrical signals, each such signal being representative of discontinuity size, and for developing an output indicative of the cumulative effect of the individual discontinuities on the predetermined physical characteristics of said specimen which determine its grade or quality;
and timing means synchronized with said energizing means for connecting said storage means to said computer during inoperative intervals of said energizing means.

11. A system for non-destructively inspecting a predetermined percentage portion of the internal volume of a nominally homogeneous metal specimen and electronically grading said specimen according to the cumulative effect of measured non-metallic inclusions or other discontinuities within said specimen, comprising:
transducer means adapted for transmitting ultrasonic wave signal energy into said metal specimen;
energizing means, coupled to said transducer means, for rendering said transducer means operative and inoperative in alternate time intervals;
scanning means for effecting relative movement between said metal specimen and said transducer means to permit said transducer means to transmit ultrasonic wave energy to a plurality of individual volume elements of said metal specimen;
signal handling means, coupled to said transducer means, for developing electrical signals representative of ultrasonic wave energy reflected from within preselected portions of individual volume elements of said specimen during a first operating interval of said transducer means and for temporarily storing said representative electrical signals for a time not exceeding the termination of a second operating interval of said transducer means;
computer means coupled to said signal handling means and adapted to process a series of individual electrical signals each representative of discontinuity characteristics within corresponding preselected portions of said plurality of volume elements of said metal specimen for developing output information indicative of the cumulative effect of said individual discontinuity characteristics on a predetermined physical characteristic of said specimen;
and timing means, synchronized from said energizing means, for momentarily enabling said computer to individually read said representative electrical signals from said signal handling means during each temporary storage interval.

12. The system of claim 11 in which said signal handling means is adapted for temporarily storing only the maximum amplitude electrical signal reflected from said preselected portion of each of said plurality of volume elements.

13. The system of claim 12 in which said computer means relatively weights said maximum amplitude signals in proportion to the relative effect of the discontinuity size represented by each of said signals on a predetermined physical characteristic of said metal specimen as determined from pre-established reference data and further in which said computer means effectively sums said weighted signal information to calculate a relative quality grading index of said metal specimen for said predetermined physical characteristic.

14. The system of claim 13 in which said ultrasonic wave signal energy is of a frequency on the order of magnitude of five megacycles per second.

15. A system for non-destructively inspecting a predetermined portion of the internal volume of a nominally homogeneous metal specimen and electronically rating said specimen according to the cumulative effect of measured non-metallic inclusions or other discontinuities within said specimen, comprising:
transducer means for transmitting ultrasonic wave signal energy into said metal specimen;
scanning means for effecting relative movement between said metal specimen and said transducer means to permit said transducer means to transmit ultrasonic wave energy into a plurality of individual volume elements of said specimen;
signal handling means coupled to said transducer means and responsive to ultrasonic wave energy reflected from within each of said incremental sample volume elements for developing individual electrical signals representative of the size of a detected discontinuity within a corresponding sample volume element;
comparator means adapted for interrelating individual electrical signals with predetermined reference data signals indicative of the known effect of discontinuities of various sizes on a predetermined physical characteristic of a material of the same type as that of said specimen for developing an output signal indication representative of the cumulative effect of the discontinuities represented by said individual electrical signals on a predetermined physical characteristic of said specimen;
and means interconnecting said signal handling means and said comparator means for applying said discontinuity size representative electrical signals from said sample volume elements to said comparator means as individual electrical signals.

16. The system of claim 15 in which said signal handling means includes a peak signal sampling circuit for detecting only the maximum size discontinuity in each of said incremental sample volume elements.

17. The system according to claim 16 in which said comparator means is adapted for weighting said electrical signal representations of said maximum size discontinuities according to the relative effect of the discontinuity size represented by each of said signals on said predetermined physical characteristic as established from said reference data and is further adapted for effectively summing said weighted signals to develop a relative grading index representative of the cumulative effect of the discontinuities on said predetermined physical characteristic.

18. The system of claim 17 in which said transducer means transmits ultrasonic wave signal energy of a frequency on the order of magnitude of five megacycles per second.

19. A method for non-destructively inspecting a predetermined percentage portion of the internal volume of a nominally homogeneous metal specimen to detect at least a percentage of the non-metallic inclusions or other discontinuities therewithin and for predicting the cumulative effect of the individual non-metallic inclusions or other discontinuities within said specimen on one or more selected physical characteristics of said specimen, said method comprising the steps of:

transmitting ultrasonic wave energy into a predetermined plurality of individual volume elements of said specimen;

receiving ultrasonic wave signal energy reflected from within a preselected portion of each of said plurality of individual volume elements, which reflected wave energy is representative of predetermined discontinuity size characteristics within said preselected portion of each of said volume elements;

developing distinct electrical signal groups each group representative of the ultrasonic wave energy reflected from within said preselected portion of each of said volume elements;

weighting the signal information of at least predetermined ones of said electrical signal groups in proportion to the relative effect of the discontinuity characteristics represented by the signal information of each group on a predetermined physical characteristic of said metal specimen as determined from pre-established reference data; and integrating said weighted signal information for generating output information indicative of the sum effect of the individual discontinuity size characteristics on a predetermined physical characteristic of said specimen.

20. The method of claim 19 including the further step of sampling and recording only the maximum amplitude electrical signal within each of said distinct signal groups which maximum amplitude signals are representative of the maximum size discontinuity within said respective preselected portions of each of said volume elements and thereafter integrating said maximum amplitude electrical signals according to the method of claim 22.

21. The method of claim 20 in which said integrating step comprises:

weighting said maximum amplitude electrical signals in proportion to their relative effect on a predetermined physical characteristic of said metal specimen as determined from pre-established reference data;

and effectively summing said weighted electrical signals to develop a quality rating index of said metal specimen for said predetermined physical property.

22. The method of claim 21 in which said transmitted ultrasonic signal energy is of a frequency on the order of magnitude of five megacycles per second.

23. A method of quality grading a metal specimen wherein a series of individual volume elements of said specimen have been ultrasonically interrogated and discontinuity size information from each of said individual volume elements separately recorded, said method comprising the steps of:

segregating said detected discontinuity information into a plurality of categories according to relative size;

effectively converting the number of discontinuities collected in each of said categories to an expression representative of the percentage of discontinuities in each category relative to the total number of discontinuities detected;

weighting said percentage expression of each of said categories in proportion to the relative effect of discontinuities of the size represented by said categories on the predetermined physical characteristic of said metal specimen as determined from pre-established reference data;

and summing said weighted percentage expressions to calculate a relative quality grading index of said metal specimen for said predetermined physical characteristic.

References Cited

UNITED STATES PATENTS

| 2,969,671 | 1/1961 | Sproule | 73—67.9 |
|---|---|---|---|
| 2,984,098 | 5/1961 | Loos | 73—67.9 |
| 3,033,029 | 5/1962 | Weighart | 73—67.8 |
| 3,050,988 | 8/1962 | Gordon et al. | 73—67.5 |
| 3,262,123 | 7/1966 | Crouch | 73—67.8 XR |
| 3,269,172 | 8/1966 | McGaughey | 73—67.9 XR |
| 3,287,963 | 11/1966 | Stanya et al. | 73—67.9 |
| 3,326,037 | 6/1967 | Stewart | 73—67.8 |

RICHARD C. QUEISSER, Primary Examiner

JOHN P. BEAUCHAMP, Assistant Examiner